United States Patent

[11] 3,566,041

[72] Inventors Evert Oskar Ekberg
Bridge of Weir, Scotland
Per Gustaf Jonsson, Sorlid, Sweden
[21] Appl. No. 768,777
[22] Filed Oct. 18, 1968
[45] Patented Feb. 23, 1971
[73] Assignee International Standard Electric Corporation New York, N.Y.
[32] Priority Oct. 25, 1967
[33] Great Britain
[31] 48460/67

[54] MULTIPLE STAGE SWITCHING NETWORK
9 Claims, 3 Drawing Figs.

[52] U.S. Cl. ........................................................ 179/18
[51] Int. Cl. ........................................................ H04q 3/00
[50] Field of Search ........................................... 179/18(TG), 18 (Req.), 18.21

[56] References Cited
UNITED STATES PATENTS
1,271,855 7/1918 Clausen ........................ 179/18TG

*Primary Examiner*—William C. Cooper
*Attorneys*—J. Warren Whitesel, C. Cornell Remsen, Jr., W. J. Baum, Rayson P. Morris, Percy P. Lantzy and Delbert P. Warner

ABSTRACT: In a two-stage crossbar switching network where the first stage has overflow, this is provided by overflow links each of which interconnects two switch verticals in different switches. This is by contrast with conventional systems where an overflow link interconnects a horizontal in one switch and a vertical in the other.

MULTIPLE STAGE SWITCHING NETWORK

Figure 1:
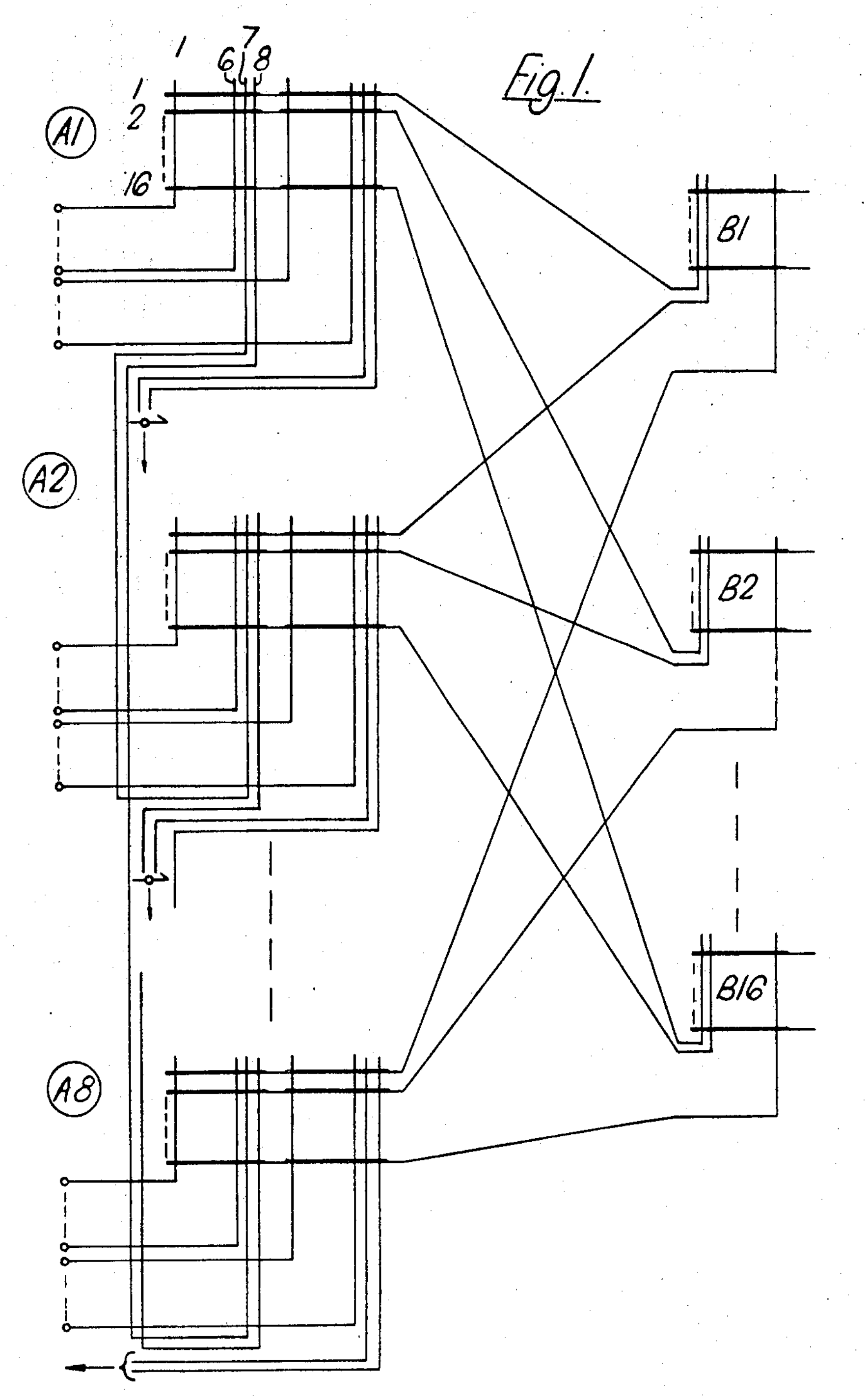

The present invention relates to an automatic telecommunication exchange in which connections are set up via electromechanical crossbar switches.

In telephone exchange systems which use crossbar switches it is well-known to use switching networks each of which includes two cascaded stages so that inlets to the first stage each have access to all outlets from the second stage. Although such a network is a simple and economical arrangement it has the disadvantage that a condition of internal blocking may arise. This condition exists when a particular connection from a calling to one of a group of outlets is needed, but although the wanted outlet group includes one or more which is idle outlets, the inlet cannot be connected to an outlet of the wanted group because all interswitch links via which such a connection could be set up are busy. To deal with this problem it is known to provide overflow links between the crossbar switches of the first stage of a network.

An object of this invention is to provide an improved arrangement for overflow links in a telephone exchange using crossbar switches.

According to the present invention there is provided an electrical switching network, such as is used in an automatic telecommunication exchange, which includes first and second stages of crossbar switches via which connections may be set up between inlets to the switches of said first stage and outlets from the switches of said second stage, wherein said first stage switches are each connected to a first coordinate multiple of a first stage switch and each of the second coordinate multiples of a first stage switch extends to a first coordinate multiple of a different one of said second stage switches, wherein each said second stage switch has its first coordinate multiples connected to second coordinate multiples of different ones of said first stage switches, so that every inlet to a first stage switch has access to every outlet from a second stage switch, wherein each said first stage switch has a plurality of first coordinate multiples usable for overflow connections, which overflow connection multiples may be used when blocking is encountered within the network, wherein each said first stage switch has its overflow multiples directly connected to overflow multiples of a plurality of other first stage switches, and wherein when blocking is encountered the connection is set up over an overflow path by connecting the inlet to be connected to one of its switches overflow multiples by suitable crossbar operations, whereafter the overflow multiple of a different first stage switch to which the first-seized overflow multiple is connected is itself connected by suitable crossbar operations to a second coordinate multiple with access to the wanted outlet or outlet group, if such a usable overflow path exists.

According to the present invention there is also provided an automatic telephone exchange in which in response to the initiation of the calling subscriber's line is connected via a plurality of switching stages of the exchange to a register, in which on reception of the exchange designation portion of a wanted subscriber's number the register determines whether the connection is to another exchange, in which if the connection is to another exchange the register causes the seizure of an outgoing trunk giving access to that exchange, whereafter a connection is set up through one or more switching stages of the exchange between the register in use for the connection and the just-seized outgoing trunk, in which the wanted number is retransmitted from said register via said one or more switching stages to the seized trunk circuit, in which when said retransmission to the remote exchange via said trunk circuit has been completed a connection is set up from the calling line to the outgoing trunk and the register is released, if such a connection is available, and in which if, owing to conditions of congestion in the switching stages no such direct connection from the calling line to the trunk circuit exists the connection is set up from the calling line via the path via which that line was connected to the register, the said register, and the path via which the register-trunk circuit connection was established to that trunk circuit.

Figure 2:
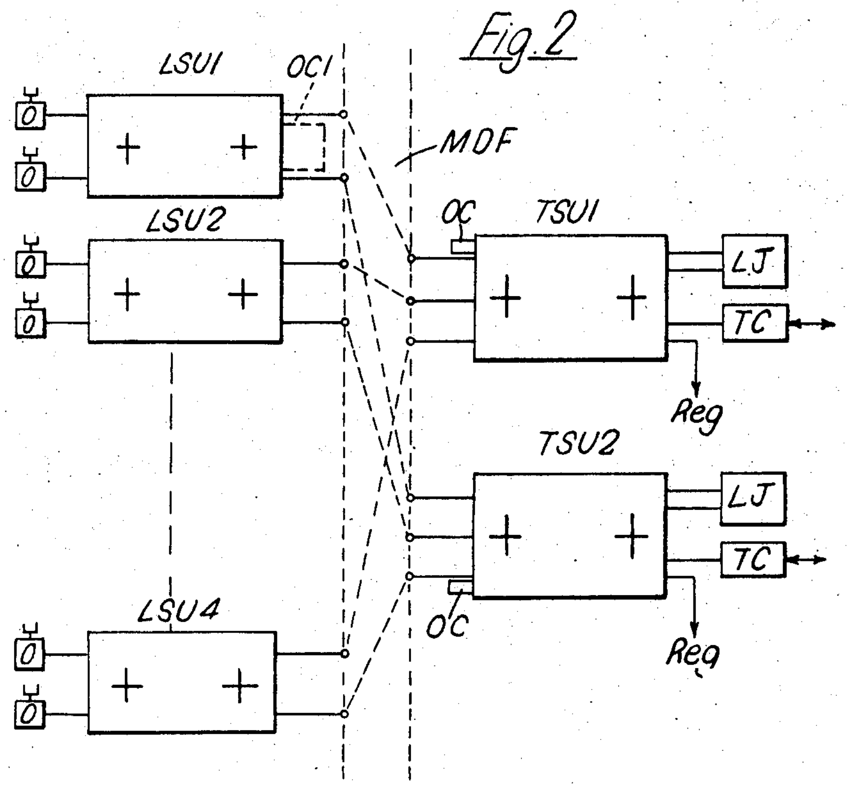
Figure 3:
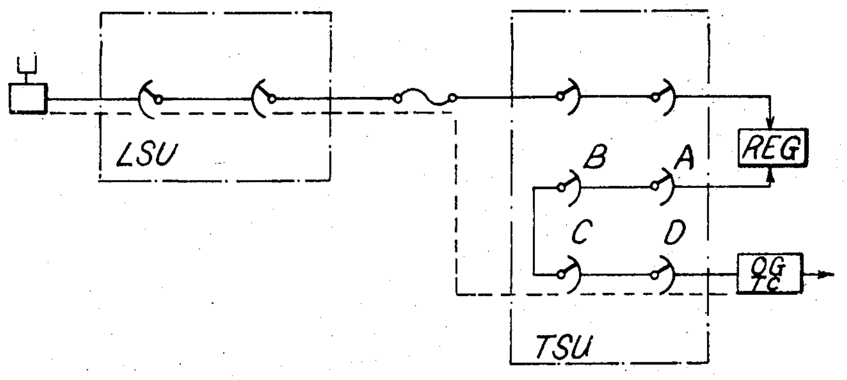

Embodiments of the present invention will now be described with reference to the accompanying drawings, in which FIG. 1 shows a switching network according to the invention, FIG. 2 shows a trunking diagram of an exchange in which such a network can be used, and FIG. 3 shows a further trunking diagram of an exchange embodying the present invention.

In the arrangement to be described, the crossbar switches used are relatively small capacity switches generally as described in U.S. Pat. No. 3,360,636 issued Dec. 26, 1967, to C. Vazquez for Switching Selecting Device, and assigned to the assignee herein. However, whereas in the above-mentioned patent the switches used are electrically held, as is usual in crossbar practice, the switches used in the arrangement described herein are mechanically held. This difference, however, does not affect the basic principle of this invention.

The basis of this invention is that each overflow link is connected to two multiples of the same type in different first stage switches. That is, where the inlets to the first stage switches are connected to the switch "verticals," then so are the overflow links. This is by contrast with other known forms of overflow connection where each overflow link connects a "vertical" in one first stage switch and a "horizontal" in another first stage switch. The present arrangement has the merit that the switch's capacity for interstage links is not reduced by the need to provide for overflow.

The switches used in the arrangement shown in the accompanying drawing each have 8 inlets and 16 outlets, and the network shown has a first stage which consists of 8 switching units A1 to A8 inclusive. Of these only A1, A2 and A8 are shown to avoid needlessly complicating the diagram. Each of these units includes two crossbar switches with their horizontal multiples connected in series and their horizontal bar magnets connected together so as to be simultaneously operable. Thus the two switches together form in effect a single switch with 16 inlets and 16 outlets.

There are 16 second stage switches B1, B2,... B16, each of which has eight inlets, one from each of the first stage units A1 to A8 and 16 outlets. It will be seen that the pattern of the interstage links is such that each A switch inlet has access to every B switch outlet.

The overflow arrangements will now be considered. Of the eight inlets of each switch which forms one of the A stage switch units, two are used for overflow, and it will be seen from the drawing that in each of these switches inlets 7 and 8 are so used. It will be appreciated that where four inlets are used for overflow they could if convenient all be on the same one of the two switches of the same switch unit.

If the overflow inlets of one A stage switch unit all extend to different ones of the other A stage units the maximum possibility exists of exploiting the A overflow to obtain access to the outlets. As an example, of the overflow inlets the disposition of these from A1 is:

a. inlet 7 of the left-hand switch of A1 goes (as can be seen in the drawing) via an overflow link to inlet 7 of the left-hand switch of A2.
b. inlet 8 of the left-hand switch of A1 goes (as can be seen in the drawing) via an overflow link to inlet 7 of A8.
c. inlet 7 of the right-hand switch of A1 goes (not shown) via an overflow link to inlet 7 of the left-hand switch of A3.
d. inlet 8 of the right-hand switch goes (not shown) via an overflow link to inlet 7 of the left-hand switch of A7.

The number of overflow inlets needed and the pattern of the connections between the overflow inlets of different switch units obviously depends on the traffic conditions for the exchange in which the switching network is to be used. Thus it may be necessary to use more or less than two out of each eight inlets for overflow.

When a connection is to be set up the controlling circuitry, which is not shown as it can follow relatively conventional principles, attempts to set up a connection directly, but it may occur that although the wanted group of outlets includes at least one idle outlet, the connection cannot be set up because internal blocking exists. Thus if an inlet connected to the switch unit A2 is to be connected to one of the outlets from switch B8, the direct connection may be impossible because the A2—B8 link is already in use.

However, since there is a "calling" inlet which is unconnected and the number of outlets equals the number of inlets, at least one outlet, i.e. at least one horizontal of A2 must be available for use. The controlling circuitry "remembers" this and then searches for an A—B link which is (*a*) free and gives access to the switch B8 and (*b*) is connected to an A switch which is connected by an overflow link to the "calling" A switch A2.

Assuming that the A1—B8 link is free, the controlling circuitry now "decides" that this connection is to be set up via that link. Hence the calling inlet's "vertical" in switch unit A2 is connected to a free "horizontal" of A2, this free "horizontal" is connected to "vertical" No. 7 of the left-hand switch of A2, and in switch unit A1, "vertical" No. 7 of the left-hand switch is connected to the "horizontal" of A1 to which the A1—B8 link is connected. Thus an overflow connection uses three cross-points in the A stage.

The above arrangement can be used for connecting calling lines to outlets to subsequent switching stages and/or registers, or can be used as a switching stage which interconnects outlets from another stage to, say, feed bridges or junctors.

A system using switching stages in this manner is shown schematically in the accompanying FIG. 2. In this exchange there are four line switching units LSU1—LSU4, each of which is a two stage network of crossbar switches serving a block of subscriber's lines. With the first stages consisting of 16A switch units with 16 outlets each connected to subscriber lines, such a unit would serve 256 lines. However, for lighter traffic lines, the A switch unit could have 32 A switches with 16 outlets each and such a network would serve 512 lines.

The B switch inlets of the line switching units are connected to one side of a main distribution frame MDF, the other side of which is connected to the inlets of two trunk switching units TSU1 and TSU2. Each of these is a network such as that shown in FIG. 1. The overflow connections are indicated by the lines OC in FIG. 2. As shown by the broken line OC' associated with LSU1, the overflow technique can also be used if desired in the line switching units.

The outlets of the trunk switching units are connected to local junctors LJ, each of which is connected to two of the outlets, to trunks each as TC, assumed to be "both" way trunks, and also to register as indicated by the lines R. In the case of an originating connection, the caller is first connected via the switching units to a free register, and then a new connection is set up, either via a local junctor or via a trunk circuit and the old connection to the register released.

Trunks usable for incoming calls may have direct access to registers.

Referring now to FIG. 3, this shows the arrangement of an exchange for use in a director area, the switching units being indicated schematically by "rotary" switches, although in practice they would use crossbar switches.

In a director area, when a connection has to be set up from a calling line to a wanted line connected to another exchange, the register has to receive the wanted number, translate its exchange designation to determine the route via which the wanted exchange is to be reached, and seize a trunk extending in the correct direction. Then the wanted number as translated, or as much of it as necessary, is sent out from the register. In the present arrangement, when this has been done the calling line is connected to the trunk and the register and the connection thereto released.

Referring to FIG. 3, when a call is initiated the calling subscriber's line is connected via his line switching unit LSU and a trunk switching unit TSU to a free register REG. The latter then sends back dialing tone and the caller dials (or otherwise emits) the wanted number, which is received and stored in the register. The latter causes a translation to be made and if the call is a local call, a local junctor (not shown in FIG. 3) is seized, and the two ends thereof connected respectively to the calling and the wanted subscriber's line. The connection between the calling line and the register, and also the register, are now released.

The above process is called "resetting," and any one of the three connections—calling line to register, calling line to junctor, wanted line to junctor, may, if necessary be set up using overflow links if such be provided.

In the case of an outgoing call, when the register "realises" that the call is outgoing, it, with the assistance of the marker (not shown) seizes a trunk with access to the wanted exchange. Such a trunk is indicated by the reference O/G TC in FIG. 3, and a path is set up between the register and that trunk. This path is indicated at A—B—C—D in FIG. 3. The wanted number, or as much thereof as necessary, is now sent via this ready-set-up path to the remote exchange.

When the above process of sending is completed, and when the selection process at the remote exchange has been completed, which may be indicated by the reception at the register of an end of selection signal, the calling line is connected to the trunk by a new path, indicated schematically in FIG. 3 by broken lines. This latter will use the crossbar switches to which the calling line and trunk are connected, but otherwise will in general be a completely new connection. The establishment of this new connection is followed by the breakdown of the calling line-register connection and of the register-trunk connection.

If, when the attempt is made to set up the calling line-trunk connection it is found that, congestion prevents such setting up, even with the use of overflow links, the connections in existence are used for the call. Thus the calling line remains connected to the register and the register remains connected to the trunk. A transmission bridge in the register may be provided for this purpose.

This interconnection technique has the merit that, in the rare cases when congestion is met in the manner just mentioned, a call whose connections have been completed at the remote exchange will not be lost.

We claim:

1. An electrical switching network, for use in an automatic telecommunication exchange, which includes first and second stages of crossbar switches by way of which connections may be set up from inlets of said first stage switches to outlets of said second stage switches, wherein outlets of said first stage switches are each connected to a respective inlet of a second stage switch, so that every inlet to a first stage switch has access to every outlet from a second stage switch, and certain inlets of each first stage switch are connected to inlets of respective other ones of said first stage switches to provide a plurality of inlets usable for overflow connections, which overflow connections may be used when blocking is encountered within the network, wherein each of said first stage switch inlets are directly connected to overflow inlets of a plurality of other first stage switches, so that when blocking condition is encountered, the connection is set up over an overflow path by connecting the inlet to be connected to one of the overflow outlets of the same switch by suitable crossbar operations to a second outlet with access to the wanted outlet of said second stage switch if such usable overflow path exists.

2. A network as claimed in claim 1, wherein each said first stage switch is formed by two similar small capacity crossbar switches with the outlets interconnected, and wherein each of said two similar crossbar switches has at least one of its inlets usable for overflow connections.

3. An automatic telephone exchange which comprises a plurality of networks each including a plurality of cascaded stages of crossbar switches with subscriber's lines connected to the inlet multiples of its first stage switches, and at least one of said networks comprising a plurality of switching units in a first stage of said network having connection to a plurality of switching units in said second stage, a plurality of outlets in each of said first stage switching units for connection of an outlet from each such switching unit to the inlet of a switching unit of said second stage, and wherein each switching unit of said second stage has an input from the output of each switching unit of said first stage, and overflow means in each switching unit of said first stage connected to individual respective overflow inlets of different switching units of said first stage, the one network having its outlets connected to the second stage inlets of said first networks to which said lines are connected.

4. An exchange as claimed in claim 3, wherein there are a plurality of trunks, each of which gives access to a different exchange, which trunks are also connected to the inlets of said first stage switches of said first network.

5. An exchange as claimed in claim 3, wherein there are a plurality of registers, one of which is seized for use for each connection originated by one of said lines or transmitted over one of said trunks for connection to a plurality of register access circuits, and wherein each said register access circuit which has access to more than one of said registers and each register access circuit is included in the connection from a first network outlet to a further network inlet.

6. An exchange as claimed in claim 3, wherein trunk circuits giving access to remote exchanges are provided, each said trunk circuit being connected to a further switching network inlet.

7. An exchange as claimed in claim 6, wherein in the case of an outgoing call a trunk circuit which gives access to the wanted exchange is seized and the register connected thereto via one or more switching stages, wherein the wanted number is sent from the register via said one or more switching stages to the trunk circuit, and wherein after said sending has been completed the calling line is connected to the trunk circuit and the register and the connections thereto are released.

8. A multiple stage switching network, wherein each stage comprises a plurality of coordinate switch units with inputs to the switch units of said first stage connected to initiate a path through said network, and the outputs of each switch unit of one stage are connected to the inputs of switch units of said next stage to provide direct access from each switch unit of said first stage to each switch unit of said next stage, and overflow means for connecting each switch unit of said first stage to individual inputs within a plurality of said other switch units of said first stage to provide a plurality of alternate paths from each switch unit of said first stage to the next stage.

9. A network as claimed in claim 8, wherein each switch unit comprises two joined crossbar switches with inputs at one coordinate and outputs at the other, the said overflow means comprises cross connections from overflow inputs at said one coordinate of each switch of a switch unit connected to other input coordinates of other switch units of the same stage.